US010674660B2

(12) United States Patent
Matsuzawa et al.

(10) Patent No.: US 10,674,660 B2
(45) Date of Patent: Jun. 9, 2020

(54) AUTONOMOUS LAWN MOWER WITH MOVABLE COVER

(71) Applicant: HONDA MOTOR CO., LTD., Tokyo (JP)

(72) Inventors: Kohei Matsuzawa, Wako (JP); Susumu Okubo, Wako (JP); Takahide Konchi, Wako (JP); Takahiro Yamamoto, Wako (JP); Atsushi Moroi, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 204 days.

(21) Appl. No.: 15/995,440

(22) Filed: Jun. 1, 2018

(65) Prior Publication Data

US 2018/0271014 A1    Sep. 27, 2018

Related U.S. Application Data

(63) Continuation of application No. PCT/JP2015/085956, filed on Dec. 24, 2015.

(51) Int. Cl.
*A01D 34/81* (2006.01)
*A01D 34/00* (2006.01)
(Continued)

(52) U.S. Cl.
CPC ........... *A01D 34/81* (2013.01); *A01D 34/008* (2013.01); *A01D 34/64* (2013.01); *A01D 34/863* (2013.01); *A01D 2101/00* (2013.01); *B60L 1/003* (2013.01)

(58) Field of Classification Search
CPC ..... A01D 34/008; A01D 34/81; A01D 34/863
See application file for complete search history.

(56) References Cited

U.S. PATENT DOCUMENTS

2014/0373497 A1* 12/2014 Bjorn .................... A01D 75/18
                                                   56/10.2 R
2015/0185733 A1*  7/2015 Jagenstedt ........... A01D 34/008
                                                   701/25
(Continued)

FOREIGN PATENT DOCUMENTS

EP     2425700 A2    3/2012
EP     2687077 A2    1/2014
(Continued)

OTHER PUBLICATIONS

European Search Report issued for European Patent Application No. 15911317.4 dated Dec. 5, 2018.

*Primary Examiner* — Alicia Torres
(74) *Attorney, Agent, or Firm* — Thomas | Horstemeyer, LLP (57) ABSTRACT

An autonomous lawn mower includes a movable cover covering a traveling frame and holding devices holding the movable cover. Each holding device includes a holding shaft and a shaft holding unit. The holding shaft includes a lower half portion and an upper half portion. The shaft holding unit holds the lower half portion accommodated in an accommodating portion of the traveling frame such that the lower half portion can slide in only a horizontal direction. The upper half portion extends through a through hole of the movable cover by extending upward from the traveling frame, thereby holding the movable cover so that the movable cover is vertically displaceable. A coil spring intervenes between a receiving portion and an upper wall of the movable cover. One holding device includes a detector which detects the slide displacement amount of the lower half portion.

7 Claims, 4 Drawing Sheets

(51) Int. Cl.
*A01D 34/86* (2006.01)
*A01D 34/64* (2006.01)
A01D 101/00 (2006.01)
B60L 1/00 (2006.01)

(56) References Cited

U.S. PATENT DOCUMENTS

2016/0081526 A1* 3/2016 Gottinger ............ A47L 11/4008
                                                                                                                    180/89.1
2017/0042085 A1* 2/2017 Bjorn ...................... B60L 53/16

FOREIGN PATENT DOCUMENTS

| EP | 2692220 A1 | 2/2014 |
| WO | 2013/125992 A1 | 8/2013 |

* cited by examiner

AUTONOMOUS LAWN MOWER WITH MOVABLE COVER

This application is a Continuation of International Patent Application No. PCT/JP2015/085956, filed Dec. 24, 2015, which is hereby incorporated by reference herein in its entirety.

TECHNICAL FIELD

The present invention relates to a technique of improving an autonomous lawn mower.

BACKGROUND ART

Lawn mowers include an autonomous lawn mower capable of autonomously traveling without being steered by a worker. This autonomous lawn mower can automatically travel on the lawn by traveling wheels, and mow the lawn by a cutter blade which rotates almost horizontally, and is known as a so-called robotic lawn mower. An autonomous lawn mower like this is known from European Patent Application Publication No. 2687077.

This autonomous lawn mower known by European Patent Application Publication No. 2687077 includes a traveling frame provided with traveling wheels, and a movable cover covering the upper portion and side portions of the traveling frame. The movable cover is held by a plurality of holding devices so as to be displaceable in the horizontal direction and vertical direction with respect to the traveling frame. A displacement amount detector detects the displacement amount with respect to the traveling frame. This displacement amount detector is isolated from and independent of the plurality of holding devices.

Each of the plurality of holding devices includes an accommodating chamber, a vertical shaft, a buffer, and a compression coil spring. The accommodating chamber is formed in the traveling frame. The vertical shaft has an axis vertically extending with respect to the traveling frame, and is accommodated in the accommodating chamber so as to be vertically slidable. The upper end of the vertical shaft is exposed from the accommodating chamber. The buffer is a rubber product having a lower end fixed to the upper end of the vertical shaft, and an upper end fixed to the lower end face of the movable cover. A middle portion of this buffer in the height direction is elastically deformable in the horizontal direction. The compression coil spring biases the vertical shaft downward, thereby pulling the movable cover toward the upper surface of the traveling frame through the buffer. If a side surface of the movable cover hits an obstacle while the autonomous lawn mower is traveling, the buffer elastically deforms in the horizontal direction. As a consequence, the movable cover is displaced in the horizontal direction. The displacement amount detector detects the displacement amount of the movable cover.

To enable the displacement amount detector to accurately detect the displacement amount of the movable cover, the buffer must have a large allowable deformation amount, and a constant deformation resistance with respect to a load in the horizontal direction. However, the buffer is a simple rubber product, so an allowable deformation amount which allows elastic deformation in the horizontal direction is small. To increase the allowable deformation amount of the buffer, it is necessary to increase the length of a middle portion of the buffer in the vertical direction. However, this is not a good plan because the height of the autonomous lawn mower increases. In addition, the rubber buffer changes the deformation resistance with respect to a load in the horizontal direction.

Furthermore, when improving the autonomous lawn mower so that the horizontal displacement amount of the movable cover can be increased with respect to the traveling frame, the following feature must be taken into consideration. That is, when the autonomous lawn mower is traveling, the traveling vibration is transmitted from the lawn surface to the traveling frame through the traveling wheels. If the movable cover and the portion holding the movable cover hit each other due to this traveling vibration, noise may be generated.

SUMMARY OF INVENTION

It is an object of the present invention to provide a technique capable of increasing the horizontal displacement amount of a movable cover with respect to a traveling frame, and suppressing the traveling noise of an autonomous lawn mower.

According to an aspect of the present invention, there is provided an autonomous lawn mower comprising a movable cover configured to cover an upper portion and side portions of a traveling frame provided with traveling wheels, and a plurality of holding devices configured to hold the movable cover such that the movable cover is displaceable in a horizontal direction and a vertical direction with respect to the traveling frame, wherein each of the plurality of holding devices comprises: a holding shaft formed by a single rod-like member having an axis which vertically extends with respect to the traveling frame, and having an upper half portion which is exposed upward from the traveling frame; an accommodating portion formed in the traveling frame and configured to accommodate a lower half portion of the holding shaft; and a shaft holding unit configured to hold the lower half portion accommodated in the accommodating portion such that the lower half portion can slide in only a direction substantially perpendicular to the axis of the holding shaft, the shaft holding unit includes a slider formed on the lower half portion, and a guide portion configured to guide the slider such that the slider can slide in the direction perpendicular to the axis of the holding shaft, the movable cover has a through hole through which the upper half portion of the holding shaft can vertically extend, the through hole has a size which can displace the movable cover substantially only vertically with respect to the upper half portion, the upper half portion extends upward from the movable cover through the through hole, and has a spring receiving portion configured to receive one end of a compression coil spring in an upper end or in the vicinity of the upper end, the compression coil spring intervenes between the spring receiving portion and an upper wall of the movable cover, and at least one of the plurality of holding devices includes a shaft displacement amount detector configured to detect a horizontal slide displacement amount of the lower half portion of the holding shaft with respect to the traveling frame.

Further features of the present invention will become apparent from the following description of exemplary embodiments (with reference to the attached drawings).

DESCRIPTION OF EMBODIMENTS

Embodiments according to the present invention will be explained below with reference to the accompanying drawings.

An autonomous lawn mower according to an embodiment will be explained with reference to the accompanying drawings. Note that Fr, Rr, Le, and Ri respectively indicate the front side, rear side, left side, and right side.

Figure 1:
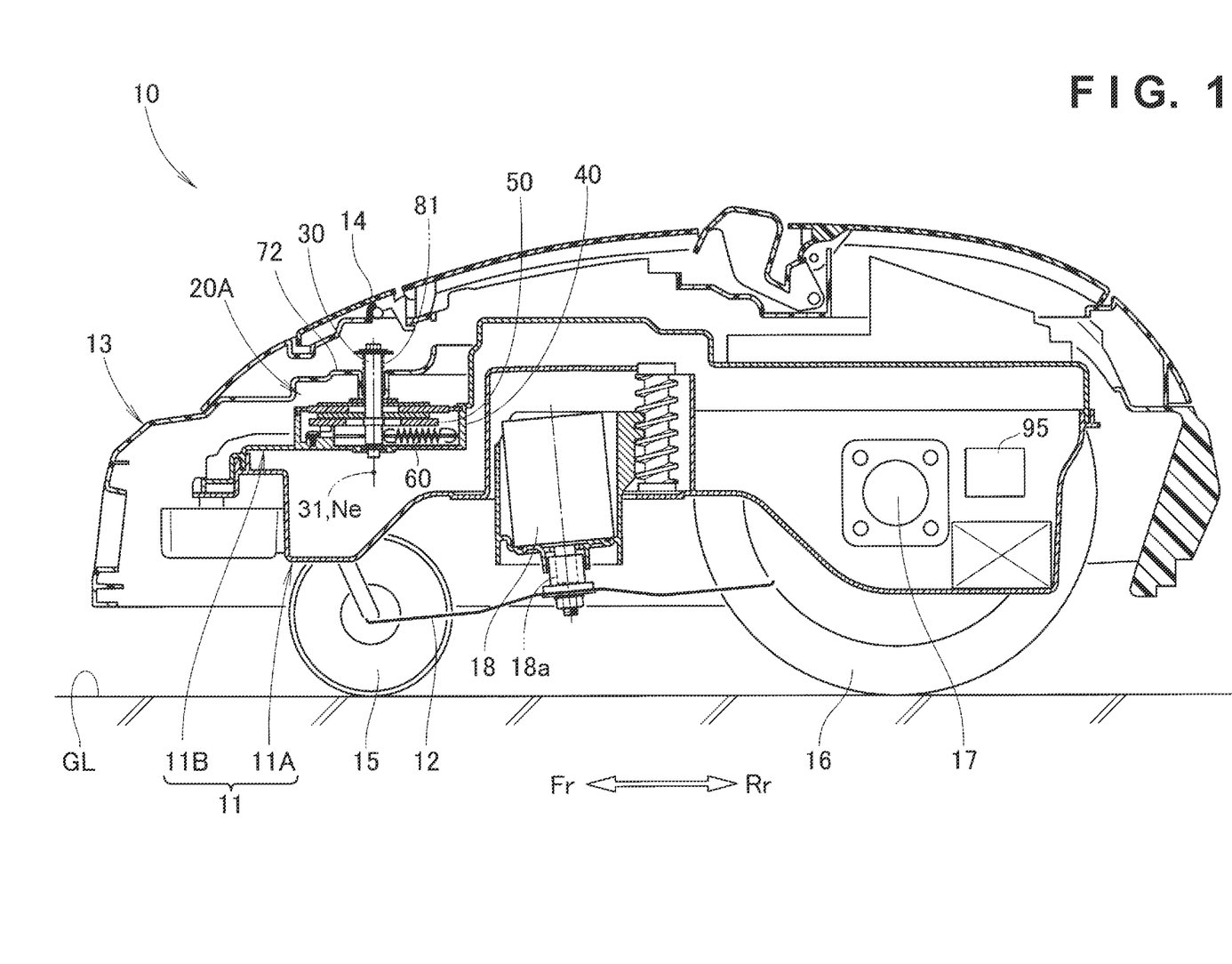
FIG. 1 is a sectional view showing an autonomous lawn mower according to the present invention sideways.

As shown in FIG. 1, an autonomous lawn mower 10 is a kind of a working machine capable of autonomously traveling without being steered by a worker. The autonomous lawn mower 10 can cut the grass by a cutter blade 12 which rotates almost horizontally while automatically traveling on lawn GL by four traveling wheels 15 and 16 (only the right side is shown), and is known as a so-called robotic lawn mower. The autonomous lawn mower 10 will simply be abbreviated as "the lawn mower 10" hereinafter. The lawn mower 10 includes a traveling frame 11, the cutter blade 12, a movable cover 13, and a decorative cover 14.

The traveling frame 11 is provided with the four traveling wheels 15 and 16. The traveling frame 11 includes an under frame 11A provided with the four traveling wheels 15 and 16, and an upper frame 11B so formed as to substantially cover the whole upper surface of the under frame 11A. The upper frame 11B is positioned above the under frame 11A with a predetermined spacing between them, and attached to the under frame 11A so as to be detachable.

The four traveling wheels 15 and 16 include left and right front wheels 15 in the front portion of the traveling frame 11, and left and right rear wheels 16 in the rear portion of the traveling frame 11. The left and right rear wheels 16 are individually driven by left and right traveling electric motors 17. The lawn mower 10 travels straight forward or backward when the left and right traveling electric motors 17 rotate forward at equal speeds, or rotate reversely at equal speeds. Also, the lawn mower 10 turns when one of the left and right traveling electric motors 17 rotates reversely.

The cutter blade 12 (a lawn mowing unit 12) is positioned below the center of the traveling frame 11, and driven by a cutter blade electric motor 18. The cutter blade electric motor 18 has an output shaft 18a which extends to a portion below the traveling frame 11, that is, extends toward the lawn GL below from the lower end. The output shaft 18a extends in the vertical direction of the traveling frame 11, and is almost perpendicular to the horizontal lawn GL, that is, the ground GL.

Figure 2:
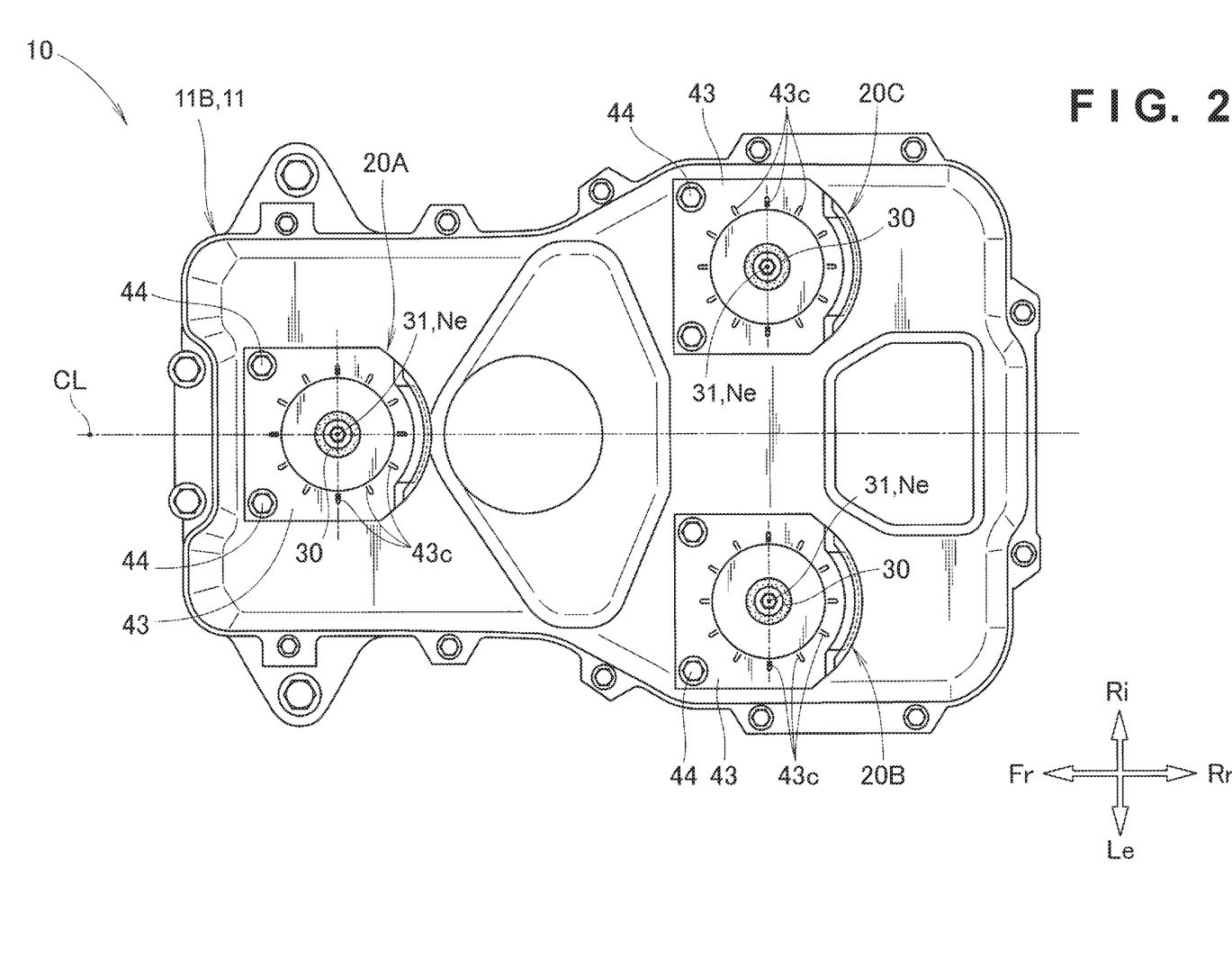
FIG. 2 is a plan view showing an arrangement in which a movable cover and decorative cover are removed from the autonomous lawn mower shown in FIG. 1.

The movable cover 13 covers the upper portion and side portions of the traveling frame 11. More specifically, the movable cover 13 substantially covers the upper surface and side surfaces of the traveling frame 11. The movable cover 13 is held by a plurality of holding devices 20A, 20B, and 20C (see also FIG. 2) so as to be displaceable in the horizontal direction and vertical direction with respect to the traveling frame 11. As shown in FIG. 2, three holding devices 20A, 20B, and 20C are preferably formed in the traveling frame 11. A first holding device 20A is positioned on a central line CL (a frame width central line CL) in the widthwise direction of the traveling frame 11, and positioned in the front portion of the traveling frame 11. A second holding device 20B and a third holding device 20C are positioned on the left and right sides of the frame width central line CL, and positioned in the rear portion of the traveling frame 11.

Figure 3:
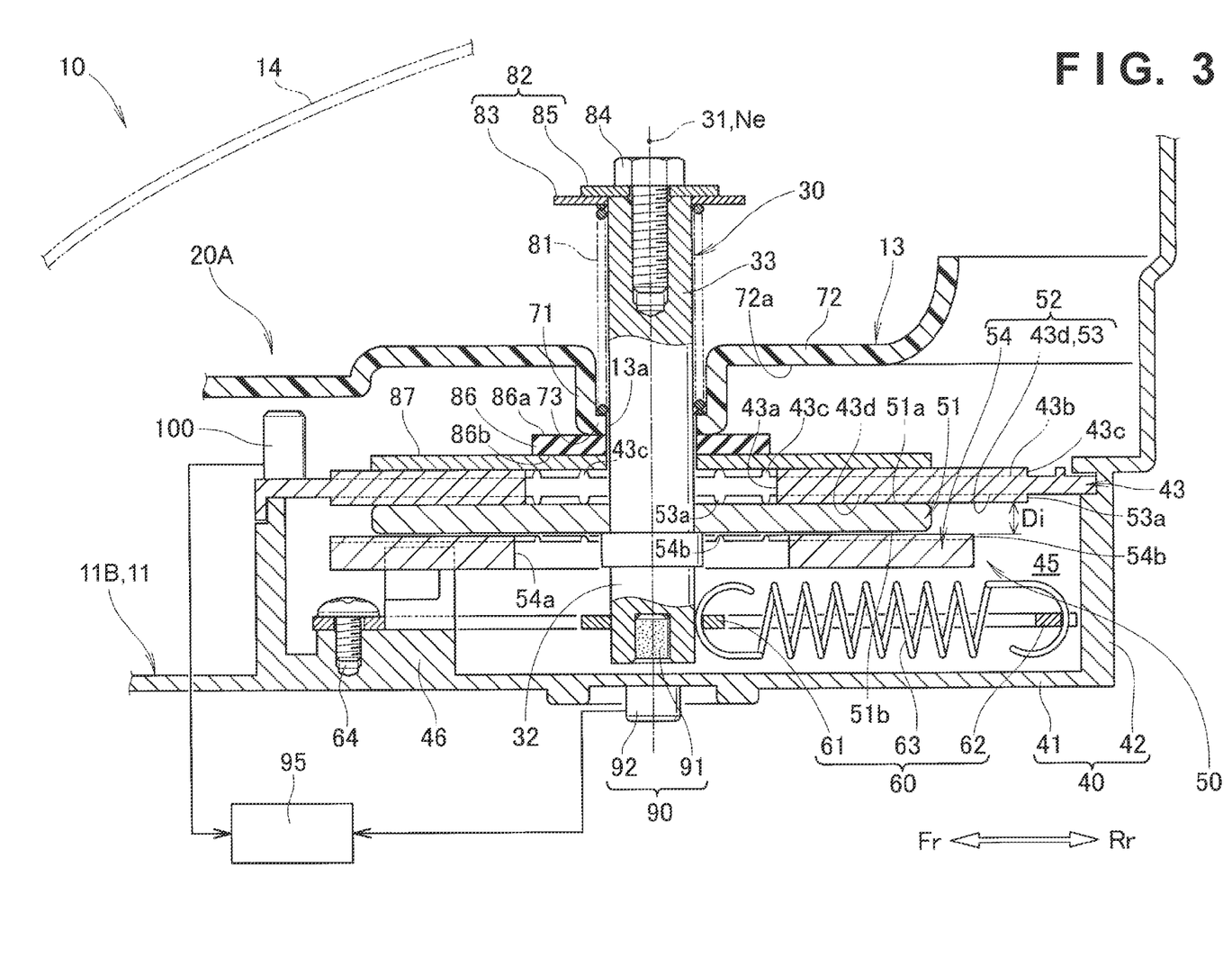
FIG. 3 is a view showing a first holding device shown in FIG. 1 in an enlarged scale.

The plurality of holding devices 20A, 20B, and 20C have the same arrangement, and each include a holding shaft 30, an accommodating portion 40, a shaft holding unit 50, a neutral returning unit 60, and a compression coil spring 81 shown in FIG. 3. Note that at least one of the plurality of holding devices 20A, 20B, and 20C, for example, the first holding device 20A includes a shaft displacement amount detector 90 (see FIG. 3). Preferably, all of the holding devices 20A, 20B, and 20C include the shaft displacement amount detector 90.

Figure 4:
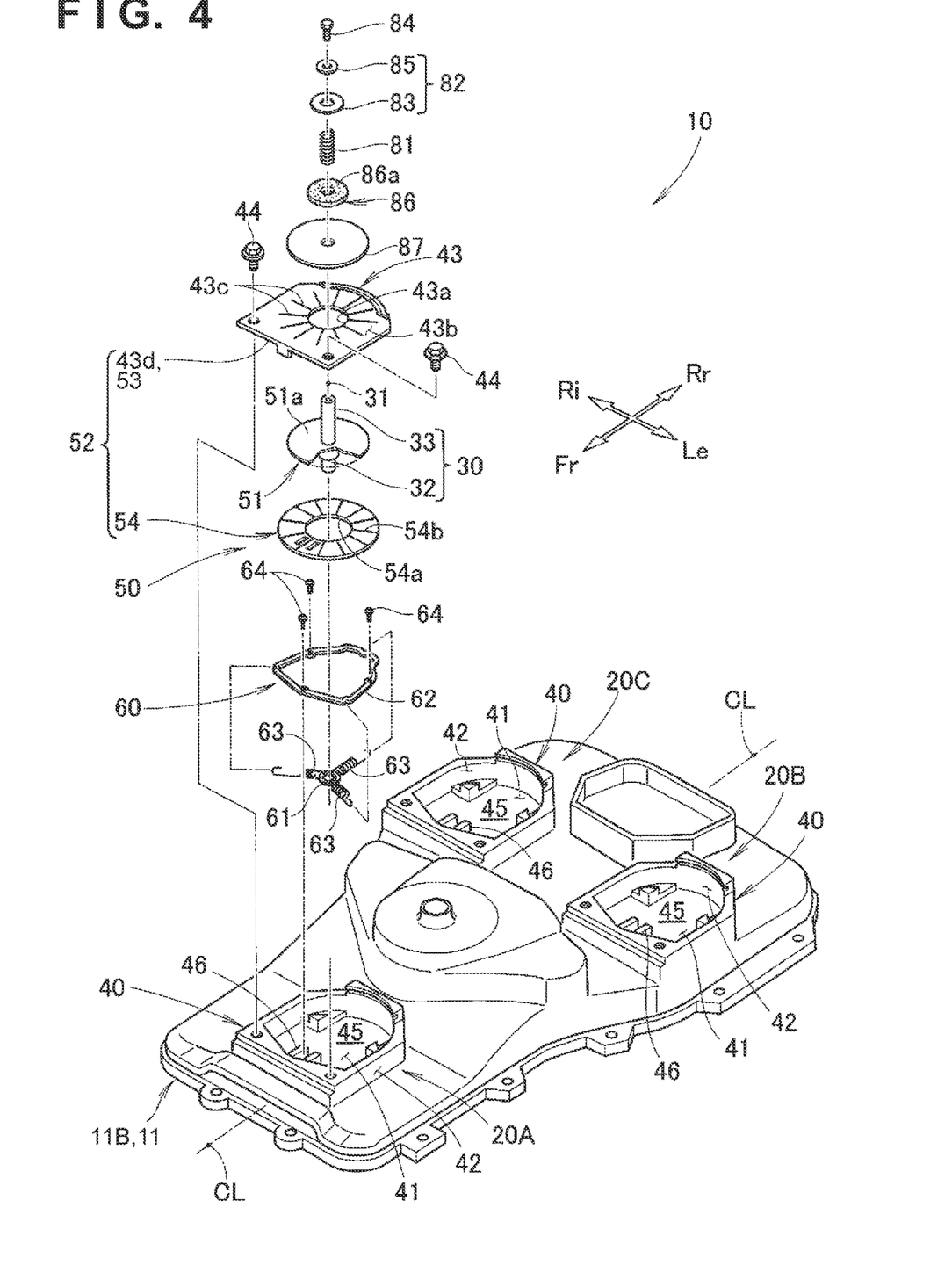
FIG. 4 is an exploded view of an upper frame and the first holding device shown in FIG. 1.

The first holding device 20A will be explained in detail below with reference to FIGS. 3 and 4. An explanation of the second and third holding devices 20B and 20C will be omitted.

The holding shaft 30 of the first holding device 20A is formed by a single rod-like member. An axis 31 of the holding shaft 30 vertically extends with respect to the traveling frame 11. The holding shaft 30 includes a lower half portion 32 accommodated in the accommodating portion 40 of the traveling frame 11, and an upper half portion 33 exposed upward from the traveling frame 11. The lower half portion 32 is held by the shaft holding unit 50 so as to be slidable in only the horizontal direction with respect to the traveling frame 11, that is, in only a direction perpendicular to the axis of the holding shaft 30. The upper half portion 33 extends upward from the movable cover 13 through a through hole 13a of the movable cover 13, thereby holding the movable cover 13 such that the movable cover 13 is vertically displaceable.

The accommodating portion 40 is formed in the traveling frame 11 so as to be able to accommodate the lower half portion 32 of the holding shaft 30. More specifically, the accommodating portion 40 is integrated with the upper surface of the under frame 11A of the traveling frame 11, and has an open upper end. That is, the accommodating portion 40 includes a flat bottom plate 41, and a circumferential wall 42 standing from the circumferential edge of the bottom plate 41 so as to surround the bottom plate 41. The upper end of the accommodating portion 40 is closed with a flat plate-like lid 43. The lid 43 is attached to the upper end face of the accommodating portion 40 by a plurality of bolts 44 so as to be detachable. Thus, an accommodating space 45 surrounded by the bottom plate 41, circumferential wall 42, and lid 43 is formed inside the accommodating portion 40.

The lower half portion 32 of the holding shaft 30 is accommodated in the accommodating space 45. A true-circular through hole 43a is formed in the center of the lid 43 so as to vertically extend through it. The holding shaft 30 vertically extends through the through hole 43a.

As described above, the accommodating portion 40 is formed in the traveling frame 11. The lid 43 is attached to the accommodating portion 40 by the bolts. Therefore, the accommodating portion 40 and lid 43 can be regarded as substantially a part of the traveling frame 11.

A plurality of ribs 43c are formed on an upper surface 43b of the lid 43, that is, on an upper surface 43b of the traveling frame 11. The plurality of ribs 43c are formed into projecting lines which slightly project upward from the upper surface 43b and narrowly extend along the upper surface 43b. The plurality of ribs 43c will be referred to as "the plurality of frame-side ribs 43c" hereinafter. The plurality of frame-side ribs 43c are arrayed into a radial shape in a planar view around the through hole 43a (the holding shaft 30).

The shaft holding unit 50 holds the lower half portion 32 accommodated in the accommodating portion 40 such that the lower half portion 32 can slide in only a direction substantially perpendicular to the axis 31 of the holding shaft 30. The shaft holding unit 50 is accommodated in the accommodating portion 40, and includes a slider 51 and a guide portion 52.

The slider 51 is formed on the lower half portion 32 of the holding shaft 30. The slider 51 is formed by a flat circular plate centered on the axis 31 of the holding shaft 30, and integrated with an almost center of the lower half portion 32 in the longitudinal direction.

The guide portion 52 slidably guides in the direction perpendicular to the axis 31 of the holding shaft 30. The guide portion 52 includes an upper guide portion 53 and a lower guide portion 54.

The upper guide portion 53 guides an upper surface 51a of the slider 51 so that the upper surface 51a can slide in the direction perpendicular to the axis 31 of the holding shaft 30. The upper guide portion 53 is formed by a reverse surface 43d (a lower surface 43d) of the lid 43, and parallel to the plate surface of the slider 51. A plurality of ribs 53a are formed on the upper guide portion 53, that is, on the reverse surface 43d of the lid 43. The plurality of ribs 53a are formed into projecting lines which slightly project downward from the reverse surface 43d and narrowly extend along the reverse surface 43d. The plurality of ribs 53a will be referred to as "the plurality of upper-guide-side ribs 53a" hereinafter. The plurality of upper-guide-side ribs 53a have substantially the same arrangement as that of the plurality of frame-side ribs 43c, and are arrayed into a radial shape in a planar view around the through hole 43a (the holding shaft 30).

The lower guide portion 54 guides a lower surface 51b of the slider 51 so that the lower surface 51b can slide in the direction perpendicular to the axis 31 of the holding shaft 30. The lower guide portion 54 is formed by a flat circuit plate, and positioned parallel to the plate surface of the slider 51. The lower guide portion 54 is positioned higher than the bottom plate 41 of the accommodating portion 40, and detachably attached to a plurality of bosses 46 standing from the bottom plate 41. A true-circular through hole 54a is formed in the center of the lower guide portion 54 so as to vertically extend through it. The lower half portion 32 of the holding shaft 30 vertically extends through the through hole 54a.

A plurality of ribs 54b are formed on the upper surface of the lower guide portion 54. The plurality of ribs 54b are formed into projecting lines which slightly project upward from the upper surface of the lower guide portion 54 and narrowly extend along the upper surface. The plurality of ribs 54b will be referred to as "the plurality of lower-guide-side ribs 54b" hereinafter. The plurality of lower-guide-side ribs 54b have substantially the same arrangement as that of the plurality of frame-side ribs 43c, and are arrayed into a radial shape in a planar view around the through hole 43a (the holding shaft 30).

A distance Di between the plurality of upper-guide-side ribs 53a and the plurality of lower-guide-side ribs 54b is set at a value with which the upper and lower guide portions 53 and 54 can hold the slider 51 such that the slider 51 can smoothly slide in only the direction substantially perpendicular to the axis 31 of the holding shaft 30. Since the plurality of upper-guide-side ribs 53a and the plurality of lower-guide-side ribs 54b hold the slider 51, the slide resistance of the slider 51 with respect to the guide portion 52 is low. This makes it possible to more smoothly displace the holding shaft 30 in the horizontal direction.

As is apparent from the above explanation, the shaft holding unit 50 holds the lower half portion 32 of the holding shaft 30 so that the lower half portion 32 can be displaced in only the horizontal direction with respect to the traveling frame 11. In addition, the shaft holding unit 50 holds the posture in which the axis 31 of the holding shaft 30 rises in the vertical direction.

The neutral returning unit 60 causes the lower half portion 32 of the holding shaft 30 to self-return to a neutral position Ne in the horizontal direction shown in FIG. 3. The neutral returning unit 60 is accommodated in the accommodating portion 40, and positioned between the bottom plate 41 of the accommodating portion 40 and the lower guide portion 54. The neutral returning unit 60 includes a central ring portion 61 fixed to the lower half portion 32, a spring hooking portion 62 fixed to the accommodating portion 40, and a plurality of (preferably, three) tension coil springs 63 extended between the central ring portion 61 and spring hooking portion 62.

The central ring portion 61 and spring hooking portion 62 are positioned at substantially the same height in the direction of the axis 31 of the holding shaft 30. The central ring portion 61 is formed by a plate-like ring formed on the lower portion of the lower half portion 32. The spring hooking portion 62 is formed by a plate-like ring having a diameter larger than that of the central ring portion 61, and attached to the bottom plate 41 by a plurality of machine screws 64.

The plurality of tension coil springs 63 are radially positioned with respect to the axis 31 of the holding shaft 30. One end of each tension coil spring 63 is hooked on the central ring portion 61, and the other end thereof is hooked on the spring hooking portion 62.

The movable cover 13 has a swollen portion 71 positioned around the holding shaft 30. The swollen portion 71 is formed into an almost cup shape which swells downward from a lower surface 72a of an upper wall 72 of the movable cover 13. The lower end of the swollen portion 71 is formed into a flat bottom plate 73. The through hole 43a is formed in the bottom plate 73 so as to vertically extend through it. The through hole 43a enables the upper half portion 33 of the holding shaft 30 to vertically extend through it. The through hole 13a has a size by which the movable cover 13 is displaceable substantially only vertically with respect to the upper half portion 33. Thus, the movable cover 13 has the through hole 13a which enables the upper half portion 33 of the holding shaft 30 to vertically extend through it.

The upper half portion 33 of the holding shaft 30 extends upward from the movable cover 13 through the through hole 13a, and has a spring receiving portion 82 for receiving one end of a compression coil spring 81 in the upper end or in the vicinity of the upper end. The spring receiving portion 82 is preferably connected to the upper end face of the upper half portion 33 of the holding shaft 30 by a bolt. This facilitates assembling and removal of the compression coil spring 81 with respect to the upper half portion 33. More specifically, the spring receiving portion 82 includes a flat annular receiving plate 83 fitted on the upper half portion 33, and a plain washer 85 connected to the upper end face of the upper half portion 33 by a bolt 84.

The compression coil spring 81 intervenes between the spring receiving portion 82 and the upper wall 72 (the bottom plate 73 of the swollen portion 71) of the movable cover 13, thereby biasing the movable cover 13 downward. That is, the bottom plate 73 of the swollen portion 71 receives the lower end face of the compression coil spring 81. Preferably, the compression coil spring 81 is wound around the upper half portion 33 of the holding shaft 30.

An elastic member 86 intervenes between the upper surface 43b of the traveling frame 11 and the lower surface 72a of the movable cover 13 (the bottom plate 73 of the swollen portion 71 of the movable cover 13). The elastic member 86 is a flat annular plate positioned around the holding shaft 30. A lower surface 86b of the elastic member 86 is indirectly overlaid on the upper surface 43b of the traveling frame 11, that is, on the upper surface 43b of the lid 43, through a flat-plate washer 87 through which the holding shaft 30 extends. Therefore, when the movable cover 13 vertically vibrates, floats once against the biasing force of the compression coil spring 81, and then moves down, the elastic member 86 functions as a buffering material for receiving the movable cover 13. This makes it possible to suppress collision noise when the movable cover 13 hits the upper surface 43b of the traveling frame 11.

Only the bottom plate 73 of the swollen portion 71 of the movable cover 13 can contact the upper surface 86a of the elastic member 86. Accordingly, it is possible to prevent the lower surface 72a of the movable cover 13 having vertically vibrated from directly hitting the upper surface 43b of the traveling frame 11.

Furthermore, the bottom plate 73 of the swollen portion 71 receives the lower end face of the compression coil spring 81. Therefore, the compression coil spring 81 can reliably and efficiently bias the upper surface of the elastic member 86 through the bottom plate 73 of the swollen portion 71.

When the holding shaft 30 is displaced together with the movable cover 13 in the horizontal direction with respect to the traveling frame 11, the washer 87 can slide on the upper surface 43b of the traveling frame 11. Generally, the frictional resistance between the flat-plate washer 87 and the upper surface 43b of the traveling frame 11 is lower than that between the elastic member 86 and the upper surface 43b of the traveling frame 11. In addition, the plurality of ribs 43c (the frame-side ribs 43c) arrayed into a radial shape in a planar view around the holding shaft 30 are formed on the upper surface 43b of the traveling frame 11. Accordingly, the slide resistance of the washer 87 with respect to the upper surface of the traveling frame 11 is low. As a consequence, it is possible to more smoothly displace the holding shaft 30 in the horizontal direction.

The decorative cover 14 covers the upper portion of the movable cover 13, and is attached to the movable cover 13 so as to be detachable. Consequently, the decorative cover 14 covers the upper half portion 33 of the holding shaft 30 and the compression coil spring 81. Therefore, the compression coil spring 81 cannot be seen from the outside. This can improve the outer appearance of the lawn mower 10.

The shaft displacement amount detector 90 can detect the horizontal slide displacement amount of the lower half portion 32 with respect to the traveling frame 11. The lower end face of the lower half portion 32 is close to the bottom plate 41 of the accommodating portion 40. The shaft displacement amount detector 90 includes a permanent magnet 91 installed in the lower end of the holding shaft 30, and a magnetic sensor 92 installed on the lower surface of the bottom plate 41 of the accommodating portion 40. The magnetic sensor 92 is formed by, for example, a Hall-effect sensor. When the holding shaft 30 is positioned in the neutral position Ne shown in FIG. 3, the permanent magnet 91 and magnetic sensor 92 are positioned in the neutral position Ne. A controller 95 controls the left and right traveling electric motors 17 (see FIG. 1) in accordance with a detection signal from the shaft displacement amount detector 90, thereby changing the traveling direction of the lawn mower 10.

When the holding shaft 30 horizontally slides together with the movable cover 13 with respect to the traveling frame 11, the permanent magnet 91 is also displaced in the same direction. As a consequence, the magnetic sensor 92 installed in the traveling frame 11 can sense the horizontal displacement amount of the movable cover 13. Since the shaft displacement amount detector 90 is incorporated into the first holding device 20A, the arrangement of the lawn mower 10 is simpler than that when the shaft displacement amount detector 90 is isolated from and independent of the first holding device 20A.

The above explanation will be summarized below. The shaft holding unit 50 is a slide structure which includes the slider 51 formed on the lower half portion 32 of the holding shaft 30, and the guide portion 52 which guides the slider 51 such that the slider 51 can slide in the direction perpendicular to the axis 31 of the holding shaft 30. Since the shaft holding unit 50 is the slide structure, it is possible to increase the horizontal displacement amount of the lower half portion 32 of the holding shaft 30. This makes it possible to increase the displacement amount by which the movable cover 13 is displaced in only the horizontal direction with respect to the traveling frame 11. In addition, the slide resistance of the shaft holding unit 50 is substantially constant regardless of the displacement amount of the movable cover 13. Accordingly, the shaft displacement amount detector 90 can accurately detect the displacement amount of the movable cover 13.

Also, since the shaft holding unit 50 is the horizontal slide structure, the dimension of the shaft holding unit 50 in the height direction need only be small. That is, the shaft holding unit 50 can be made low-profile. Accordingly, the height of the lawn mower 10 can be decreased. In addition, although the horizontal displacement amount of the movable cover 13 can be increased, the holding shaft 30 can be formed by a single rod-like member. This can simplify the arrangement of the holding shaft 30.

Furthermore, the upper half portion 33 of the holding shaft 30 has the spring receiving portion 82 in the upper end or in the vicinity of the upper end. The compression coil spring 81 intervenes between the spring receiving portion 82 and the upper wall 72 of the movable cover 13. As a consequence, the compression coil spring 81 biases the movable cover 13 toward the upper surface 43b of the traveling frame 11. The biasing force of the compression coil spring 81 pushes the movable cover 13 against the upper surface 43b of the traveling frame 11. Also, the compression coil spring 81 biases the holding shaft 30 upward away from the upper surface 43b of the traveling frame 11. Consequently, the biasing force of the compression coil spring 81 pushes the upper surface 51a of the slider 51 against the upper guide portion 53.

When the lawn mower 10 is traveling, therefore, it is possible to minimize the vertical vibrations of the movable cover 13 and slider 51, which are generated by the traveling vibrations transmitted from the lawn surface to the traveling frame 11 through the traveling wheels 15 and 16 (see FIG. 1). Accordingly, it is possible to minimize the sound of collision of the movable cover 13 against the upper surface 43b of the traveling frame 11, and the sound of collision of the slider 51 against the guide portion 52. As a result, the traveling noise of the lawn mower 10 can be suppressed.

As is apparent from the above explanation, this embodiment can achieve the following two features at the same time. First, the use of the shaft holding unit 50 having the slide structure can increase the horizontal displacement amount of the movable cover 13 with respect to the traveling frame 11. Second, the compression coil spring 81 alone can minimize both the sound of collision of the movable cover 13 against the upper surface 43b of the traveling frame 11, and the sound of collision of the slider 51 against the guide portion 52. In addition, the collision noise can be suppressed by the simple arrangement in which the single compression coil spring 81 need only intervene between the spring receiving portion 82 formed in the upper end or in the vicinity of the upper end of the upper half portion 33 of the holding shaft 30, and the upper wall 72 of the movable cover 13.

As shown in FIG. 3, the lawn mower 10 includes a vertical detector 100 which detects the vertical displacement amount of the movable cover 13. When the movable cover 13 rises from the traveling frame 11, the vertical detector 100 detects this rising motion and generates a detection signal. In accordance with this detection signal from the vertical detector 100, the controller 95 stops the left and right traveling electric motors 17 (see FIG. 1), and also stops the cutter blade electric motor 18 (see FIG. 1). Consequently, the lawn mower 10 stops traveling, and the cutter blade 12 stops rotating.

The invention claimed is:

1. An autonomous lawn mower comprising a movable cover configured to cover an upper portion and side portions of a traveling frame provided with traveling wheels, and a plurality of holding devices configured to hold the movable cover such that the movable cover is displaceable in a horizontal direction and a vertical direction with respect to the traveling frame, wherein
   each of the plurality of holding devices comprises:
   a holding shaft formed by a single rod-like member having an axis which vertically extends with respect to the traveling frame, and having an upper half portion which is exposed upward from the traveling frame;
   an accommodating portion formed in the traveling frame and configured to accommodate a lower half portion of the holding shaft; and
   a shaft holding unit configured to hold the lower half portion accommodated in the accommodating portion such that the lower half portion can slide in only a direction substantially perpendicular to the axis of the holding shaft,
   the shaft holding unit includes a slider formed on the lower half portion, and a guide portion configured to guide the slider such that the slider can slide in the direction perpendicular to the axis of the holding shaft,
   the movable cover has a through hole through which the upper half portion of the holding shaft can vertically extend,
   the through hole has a size which can displace the movable cover substantially only vertically with respect to the upper half portion,
   the upper half portion extends upward from the movable cover through the through hole, and has a spring receiving portion configured to receive one end of a compression coil spring in an upper end or in the vicinity of the upper end,
   the compression coil spring intervenes between the spring receiving portion and an upper wall of the movable cover, and
   at least one of the plurality of holding devices includes a shaft displacement amount detector configured to detect a horizontal slide displacement amount of the lower half portion of the holding shaft with respect to the traveling frame.

2. The autonomous lawn mower according to claim 1, wherein the spring receiving portion is connected to an upper end face of the upper half portion of the holding shaft by a bolt.

3. The autonomous lawn mower according to claim 1, wherein
   an elastic member intervenes between an upper surface of the traveling frame and a lower surface of the movable cover, and
   the elastic member is formed by a flat annular plate positioned around the holding shaft.

4. The autonomous lawn mower according to claim 3, wherein
   a lower surface of the elastic member is indirectly overlaid on the upper surface of the traveling frame through a flat-plate washer through which the holding shaft extends, and
   a plurality of ribs arrayed into a radial shape in a planar view around the holding shaft are formed on the upper surface of the traveling frame.

5. The autonomous lawn mower according to claim 3, wherein
   the movable cover includes a swollen portion positioned around the holding shaft,
   the swollen portion is formed into an almost cup shape which swells toward an upper surface of the elastic member from the lower surface of the movable cover, and has a flat bottom plate which can contact the upper surface of the elastic member, and
   the through hole is positioned in the bottom plate.

6. The autonomous lawn mower according to claim 5, wherein the bottom plate of the swollen portion receives a lower end face of the compression coil spring.

7. The autonomous lawn mower according to claim 1, further comprising a decorative cover configured to cover an upper portion of the movable cover,
   wherein the decorative cover is attached to the movable cover such that the decorative cover is detachable, and covers the upper half portion of the holding shaft and the compression coil spring.

* * * * *